United States Patent Office 3,725,101
Patented Apr. 3, 1973

3,725,101
MONOAZO PIGMENT MIXTURES AND PROCESS FOR THEIR PREPARATION
Rudolf Kuhne, Frankfurt am Main, Heinrich Hamal, Schwalbach, Taunus, and Thilo Thilenius, Sulzbach, Taunus, Germany, assignors to Farbwerke Hoechst Aktiengesellschaft vormals Meister Lucius & Bruning, Frankfurt am Main, Germany
No Drawing. Filed Mar. 12, 1971, Ser. No. 123,818
Claims priority, application Germany, Mar. 14, 1970, P 20 12 153.3
Int. Cl. C08h 17/14
U.S. Cl. 106—288 Q                                  7 Claims

ABSTRACT OF THE DISCLOSURE

Mixtures of monoazo dyestuffs obtained by coupling diazotized aniline, which may be substituted by lower alkyl, lower alkoxy, halogen or nitro with a mixture of one or two polar coupling components of the acetoacetyl-amino benzene, 1-arylpyrazolone-(5) or naphthol series containing 1 or 2 carboxylic acid, sulfonic acid, carboxamido or sulfonamido groups and another mixture consisting of one or two unpolar coupling components of the acetoacetylaminobenzene, 1-arylpyrazolone-(5) or naphthol- series without any solubilizing group. The dyestuff mixtures show improved rheological properties and an improved tinctorial strength. Moreover, they yield purer shades and have an increased transparency.

---

The present invention relates to monoazo pigment mixtures and to a process for preparing them.

It is known that by the action of diazonium compounds or aromatic amines on coupling components from the series of the acetoacetic arylamines, the 1-arylpyrazolones-(5) or the naphthols which are free from sulfonic acid or carboxylic acid groups, a great number of water-insoluble pigment dyestuffs may be prepared, which have found a large field of application in the preparation of lacquers and paints and of colors for the graphic industry and textile printing. Some of them have become very important on an industrial scale.

These pigments, however, have a certain degree of solubility in organic solvents, which may have prejudicial effects to their applicability. Thus, it may be seen for example, that in the dispersion of certain pigments in illustration intaglio printing varnishes or in air-drying lacquers, the color intensity increases—as expected—in dependency on the dispersing time, but that it considerably decreases after reaching a maximum. This process also takes place during storage of the prepared colors or lacquers; it is accelerated by an increase of temperature and by mechanical movement. The mentioned decrease of color intensity is often accompanied by a decrease of transparency in the printing; in many cases, a simultaneous modification of the shade may be observed. These undesired processes in the preparation and storage of said dyestuffs and lacquers are caused by the recrystallization of the dispersed pigment particles by the solvent used in the reaction. On account of known physical laws, especially the little and consequently color-intense particles are dissolved, whereas the already present bigger pigment particles—depending on the product of solubility—become bigger. As solvents which cause such a "recrystallization," aromatic compounds are especially important in practice, particularly toluene and aliphatic hydrocarbons. Therefore, the decrease in tinctorial strength caused by such recrystallization processes is particularly clearly to be seen and especially disagreeable in practice, when intaglio printings on the basis of toluene are prepared.

The present invention relates to mixtures of monoazo dyestuffs consisting of 1 or 2 non-polar dyestuffs of the formulae D—N=N—A respectively D—N=N—B and 1 or 2 polar dyestuffs of the formulae D—N=N—X respectively D—N=N—Y in which D represents phenyl, which may be substituted by one to three members of the group of lower alkyl, lower alkoxy, chlorine, bromine and nitro, A and B represent 1-naphthol, 2-naphthol, 1-aryl-3-lower carbalkoxy-pyrazolone-(5), 1-aryl-3-methyl-pyrazolone-(5) or acetoacetyl-aminobenzene, which may be substituted by one to three members of the group of lower alkyl, lower alkoxy, chlorine, bromine and nitro and X and Y represent the same substituents as A and B but which contain additionally 1 or 2 carboxy, sulfonic acid, carboxamido or sulfonamido groups, with the proviso that A and B respectively, X and Y being always different, obtained by coupling 1 mol of diazotized amine of the formula

D—NH$_2$ with one mol of a mixture consisting of 0.5 to 20 mol percent, preferably 1 to 5 mol percent, of the polar coupling component of the formula H—X or H—Y or of a mixture of these two coupling components containing from 10 to 90 mol percent of one of the coupling components and from 90 to 10 mol percent of the other of the coupling components, preferably 50 mol percent of each coupling component and 99.5 to 80 mol percent, preferably 99 to 95 mol percent of the non-polar coupling component of the formula H—A or H—B or of a mixture of these two coupling components containing from 5 to 95 mol percent of one coupling component and from 95 to 5 mol percent of the other coupling component, preferably 50 mol percent of each coupling component, whereby D, A, B, X and Y have the meanings given above.

Thus, the pigments according to the invention are mixtures of two or several dyestuffs, characterized by the fact that one part of these pigments contain polar groups, especially the carboxylic acid or the sulfonic acid group, but also the primary carboxylic acid amide and the primary sulfonic acid amide group. The pigments modified in this way probably contain, on the surface of the particles of the main dyestuff, adsorptively orientated, a more or less big part of the polar dyestuff, hereinafter referred to as additive.

If, on the contrary, the separately prepared main dyestuffs and additives are mechanically mixed in the corresponding molar ratios, for example by simultaneous grinding in an appropriate grinder, there are obtained pigment mixtures, which do not show the improved technological properties which are to be found in the pigments modified according to the invention.

As coupling components employed with such polar groups, there may be mentioned from the series of the acetacetic aryl amide: 2-aceto-acetylamino-benzoic acid, 3 - acetoacetylamino-benzoic acid, 4-acetoacetylamino-benzoic acid, 2 - acetoacetylamino-toluene-4-carboxylic acid, 3-acetoacetylamino-toluene-4-carboxylic acid, 2-chloro-4-acetoacetylamino-benzoic acid, 3-chloro-4-acetoacetylamino-benzoic acid, 4-acetoacetylamino-2-hydroxy-benzoic acid, 5-acetoacetylamino-2-hydroxy-benzoic acid, 1-acetoactylamino-benzene-3, 5-dicarboxylic acid, 4-acetoacetylamino-phenyl-acetic acid, 2 - acetoacetylamino-benzene-sulfonic acid, 3-aceto-acetylamino-benzene-sulfonic acid, 4-acetoacetylamino-benzene-sulfonic acid, 3-acetoacetylamino-benzamide, 4 - acetoacetylamino-benzamide, 4-chloro-3-acetoacetylamino-benzamide, and 4-acetoacetylamino-benzene-sulfonamide.

As examples for such polar coupling components in the series of the 1-arylpyrazolones there may be cited:

3-methyl-1-(3'-sulfophenyl)-pyrazolone-(5),
3-methyl-1-(4'-sulfophenyl)-pyrazolone-(5),
3-methyl-1-(4'-carboxyphenyl)-pyrazolone-(5),
3-methyl-1-(2'-chloro-4'-sulfophenyl)-pyrazolone-(5),
3-methyl-1-(2',5'-dichloro-4'-sulfophenyl)-pyrazolone-(5),
3-methyl-1-(6'-chloro-2'-methyl-4'-sulfophenyl)-pyrazolone-(5),
1-phenyl-3-carboxy-pyrazolone-(5), and
1-(4'-sulfophenyl)-3-carboxy-pyrazolone-(5).

Examples for these polar coupling components of the naphthol series are:

2-hydroxy-3-naphthoic acid,
6-bromo-2-hydroxy-3-naphthoic acid,
2-naphthol-5-sulfonic acid,
2-naphthol-6-sulfonic acid,
2-naphthol-7-sulfonic acid,
2-naphthol-3,6-disulfonic acid,
2-naphthol-3,7-disulfonic acid,
1-naphthol-3-disulfonic acid,
1-naphthol-5-sulfonic acid,
1-naphthol-8-sulfonic acid,
1-naphthol-3,6-disulfonic acid and
1-naphthol-4,7-disulfonic acid.

Monoazo pigments, which may be modified according to the process according to the invention, are for example the dyestuffs which are formed when coupling diazotized aryl amines of the benzene series with acetacetic acid aryl amide, 1-arylpyrazolones-(5) and with naphthols. As aryl amines of the benzene series there are mentioned especially the derivatives of the 2-nitro-aniline and of the 4-nitro-aniline, which may be further substituted by one or more groups, such as halogen atoms, methyl or methoxy groups or further nitro groups, as well as the mono and polyhalogen aniline. As coupling components of such dyestuffs of the series of the acetacetic acid aryl amides there may be mentioned for example the following:

Acetoacetylamino-benzene,
2-acetoacetylamino-toluene,
4-acetoacetylamino-toluene,
2-acetoacetylamino-anisol,
4-acetoacetylamino-anisol,
2-acetoacetylamino-phenetol,
4-acetoacetylaminophenetol,
1-acetoacetylamino-2,4-dimethylbenzene,
1-acetoacetylamino-2,4-dimethoxybenzene,
1-acetoacetylamino-2,5-dimethoxy-benzene,
1-acetoacetylamino-2,5-dichlorobenzene,
1-acetoacetylamino-2,5-dimethoxy-4-chlorobenzene,
5-chloro-2-acetoacetylamino-toluene,
3-chloro-4-acetoacetylamino-toluene,
1-acetoacetylamino-naphthalene,
2-acetoacetylamino-naphthalene and other acetacetic acid aryl amides of comparable constitution.

From the series of the 1-aryl pyrazolones-(5), there are to be mentioned as coupling components for example: 1-phenyl-3-methyl-pyrazolone-(5), 1-(p-toluene)-3-methyl-pyrazolone-(5), 1-phenyl-3-carbethoxy-pyrazolone-(5) and other 1-aryl pyrazolones-(5), which in the phenyl nucleus may carry one or more substituents, such as halogen atoms, methyl or alkoxy groups or the aryl nucleus of which derives from the 1-amino-naphthalene or from the 2-amino-naphthalene, as well as pyrazolone substances of comparable constitution.

From a series of the naphthols there may be especially mentioned as coupling components the 2-naphthol and derivatives thereof substituted by halogen atoms, as for example the 6-bromo-2-naphthol, but also the 1-naphthol.

The modified pigments are prepared by coupling according to known methods, preferably by coupling the diazonium compounds with the coupling components in an aqueous medium. The addition of wetting and dispersing agents from the series of the non-ionic, cationic and anionic surface-active substances may be suitable in this case. Occasionally, it may be advantageous to aftertreat the coupling mixture at elevated temperature, if desired in the presence of organic solvents such as acetic acid, dimethylformamide, pyridine, alcohols, dichlorobenzene, quinoline and/or nitrobenzene.

The additive components are added before or after coupling. There may also be employed more than one additive component used according to the invention; for example one of the additives is introduced simultaneously with the diazonium salt solution, but separately.

Although the use of two coupling components, i.e. of a main component and a polar additive component is the preferred operation method of the process, it may be suitable in some cases, to change the method in the way that the diazonium salt solution is reacted with a mixture of two main components and at least one of the mentioned polar additive; also in these cases, the sum of the polar additives ranges between 0.5 and 20 mol percent.

The modified pigments may be blended with the coupling liquor or in the pressed cake according to usual methods, for example with metal salts of higher fatty acids, with metal resinates or with the free, saturated or unsaturated fatty acids themselves; or with resinic acids, obtained by precipitation of alkali resinates in the acid. Moreover, the incorporation of mineral acids, fatty oils or fats is possible.

Compared to the corresponding pigments prepared without polar coupling component, the pigment mixtures according to the invention have a better recrystallization capacity and consequently an improved stability of the resulting printing colors and lacquers while storing. Furthermore, the printing inks prepared from these pigments show the desired favorable rheological reaction.

Monazo pigments of the acetacetic acid arylamide series are generally distinguished by a good fastness to light and in this respect they are clearly superior to the disazo pigments of the same series. On the other side, however, they have the disadvantage that they do not reach the high tinctorial strength of the disazo pigments. It is therefore another remarkable advantage of the pigments modified according to the invention that they show not only the recrystallization stability already referred to, but also a considerably increased tinctorial strength. In most cases, they show a much purer shade and a better transparency, frequently desired for printing, for example for multi-color printing. It is especially the combination of recrystallization stability and better tinctorial strength which opens to the monoazo pigments according to the invention large fields of application, as for example the field of the illustration intaglio printing already referred to, which has been largely dominated in the last years by the disazo pigments having a smaller fastness to light but a considerably higher color intensity.

The pigment mixtures according to the invention may also be used for coloring plastics, for example plasticized polyvinyl-chloride.

Since the coloring properties of a pigment often depend on the coupling method used, the modified pigments in the examples have been compared to the pigments prepared according to the same method, but without polar additive component.

EXAMPLES

The following examples serve to illustrate the invention. The parts and percentages are by weight, unless stated otherwise.

EXAMPLE 1

(a) Diazotizing 15.2 parts of finely powdered 3-nitro-4-amino-toluene were stirred for several hours at room temperature with 100 parts by volume of water and 65 parts by volume of 5 N hydrochloric acid. The resulting crystal paste, consisting of the hydrochloride of the base, was mixed with 150 parts of ice and diazotized while stirring in usual manner by dropwise addition of 20.2 parts by volume of 5 N sodium nitrite solution. After clearing the obtained diazo solution with kieselguhr, the nitrite in excess was eliminated by addition of a sufficient amount of amidosulfonic acid.

(b) Coupling 17.01 parts of acetoacetylamino-benzene and 0.88 part of 2-acetoacetylamino-benzoic acid were stirred with 250 parts by volume of water and dissolved by addition of 28 parts by volume of a 33% aqueous sodium hydroxide solution. After diluting with 1500 parts by volume of water, the pH value was adjusted to 5.5 by addition of about 20 parts by volume of glacial acetic acid. The molar ratio of the coupling components was 96:4.

Coupling was effected at a temperature of 15–20° C. within about 1.5 hours; the cooled diazo solution was introduced under the surface of the intensively stirred coupling solution in such a way that an excess of diazonium salt in the coupling liquor could not be detected. When the coupling was finished, the whole was stirred for 30 minutes at room temperature, then suction-filtered and thoroughly washed with water on the suction-filter. Drying was effected in a drying device with circulating air at about 60° C. After grinding, a yellow pigment powder was obtained.

Comparative dyestuff 1a

According to the same method a comparative dyestuff was prepared with the modification that only acetoacetylaminobenzene was used, in the equivalent amount of 17.72 parts.

Comparative dyestuff 1b 326 parts, corresponding to 96 mol-percent of the finely ground coupling product of diazotized 3-nitro-4-amino-toluene with acetacetic acid anilide, and 15 parts, corresponding to 4 mol-percent of the coupling product of diazotized 3-nitro-4-amino-toluene with 2-carboxy-acetacetic acid anilide, were mixed in a ball mill. After a grinding time of 24 hours, a homogeneous pigment mixture was obtained.

The pigment modified according to the invention and the two comparative dyestuffs were incorporated into an illustration intaglio printing varnish having a content of toluene of 52% by weight under equal dispersing conditions with a ball mill provided with a stirrer, a so-called attritor. In order to find out the tinctorial strength, this printing ink was intimately mixed with a white illustration intaglio printing ink analogously built up and pigmented with $TiO_2$, in a vibration ball mill (paint-shaker), and comparative prints were produced with a test printing machine. It could be seen, that the prints obtained with the modified pigment have a much purer shade and a higher tinctorial strength increased by 40% compared to the prints prepared with the comparative dyestuffs 1a or 1b.

A comparison of the prints prepared with the non blended intaglio printing inks, which showed in the present case a pigment content of 6%, proved that a much better tinctorial strength was obtained with the modified pigment. Moreover, it was found that the intaglio printing ink obtained with the modified pigment did not show the loss of tinctorial strength by recrystallization which appeared in monoazo pigments of the acetacetic arylamide series. In the case of a storage test for 7 days at 50° C., the toluene intaglio printing ink obtained with the pigment modified according to the invention, remained practically stable, with regard to tinctorial strength and shade. However, the toluene intaglio printing inks from the comparative dyestuffs 1a and 1b, ground and stored under the same conditions, exhibit a remarkable decrease of tinctorial strength and simultaneously a considerable dulling of the shade.

The superiority of the modified pigment could also be seen, when it was incorporated into a zinc oxide linseed oil paste on a usual dish grinding machine, the ratio of color pigment to white pigment being 1:20. 70 parts of the modified pigment have the same tinctorial strength as 100 parts of the comparative dyestuff 1a or 1b.

EXAMPLE 2

Coupling was performed according to Example 1, with the modification that 17.63 parts of acetoacetylamino-benzene and 0.11 part of 2-acetoacetylamino-benzoic acid were employed, which corresponds to a molar ratio of 99.5:0.5.

When the ratio of color pigment to white pigment was 1:20, 85 parts of the pigment modified in this way dyed a zinc oxide linseed oil paste with the same strength as 100 parts of the compaartive dyestuff 1. When the pigment modified in this way was incorporated in a book printing varnish on a three-roller mill, a printing ink was obtained which, printed on a black bottom, showed a considerably higher transparency than one of the printing inks prepared from the comparative dyestuff 1a.

EXAMPLE 3

17.01 parts of acetoacetylamino-benzene, 0.88 part of 3-acetoacetylamino-benzoic acid and 48 parts of crystallized sodium acetate were well stirred in 800 parts by volume of water and adjusted to pH 5.5 with about 2.5 parts by volume of glacial acetic acid. At a temperature of 15–20° C., coupling was effected within 1.5 hours with a diazo solution prepared according to Example 1 from 15.2 parts of 3-nitro-4-amino-toluene and worked up as described in Example 1. A yellow pigment powder was obtained, which was to a large extent similar to the pigment modified according to Example 1, as concerns its coloring properties, but the shade of which was more greenish. The molar ratio of the coupling components was 96:4.

Comparative dyestuff 3

A comparative dyestuff was prepared according to the same method, with the modification that only acetoacetylaminobenzene was used, in the equivalent amount of 17.72 parts.

When the modified pigment was incorporated, on the paint shaker, into an air-drying varnish on the basis of a long-oil alkyd resin, a yellow lacquer was obtained, which provided lacquerings superior to the lacquerings obtained under the same conditions with the comparative dyestuff 3, as concerns the higher tinctorial strength, the purer shade and the better surface gloss. Furthermore, in the storage test, the lake color obtained with the modified pigment was stable to a large extent for 7 days at 50° C., with regard to tinctorial strength and shade, whereas the color prepared from the comparative dyestuff 3 showed, after storage, a distinct loss of tinctorial strength, which expressed itself very clearly in the lightening.

Similar results were obtained, when the modified pigment and the comparative dyestuff 3 were incorporated on a usual three roller mill in an air-drying varnish on the basis of a medium-oil alkyd resin.

EXAMPLE 4

16.32 parts of acetoacetylamino-benzene and 1.77 parts of 2-acetoacetylamino-benzoic acid were mixed while stirring in 250 parts by volume of water and dissolved by addition of 28 part by volume of a 33% aqueous sodium hydroxide solution. After diluting with 1500 parts by volume of water, 15 parts of a 10% aqueous solution of sodium colophonate were added to the obtained solution. Then the coupling solution was adjusted to pH 5.5 by addition of about 20 parts by volume of glacial acetic acid. Coupling and working up were performed according to Example 1. The molar ratio of the coupling components was 92:8.

Comparative dyestuff 4

According to the same method a comparative dyestuff was prepared with the modification that only acetoacetylaminobenzene was used, in the equivalent amount of 17.42 parts.

The pigment prepared according to Example 4 showed to a large extent similar properties as the pigment modified according to Example 1; furthermore, it is particularly suitable for being used in book printing inks, where it is distinguished, with regard to comparative dyestuff 4, by a much higher transparency.

EXAMPLE 5

Coupling was effected according to Example 1 with the modification that instead of the 2-acetoacetylamino-benzoic acid 0.94 part of 4-acetoacetylaminophenylacetic acid were used, which corresponds to a molar ratio of both components of 96:4.

When the ratio of color pigment to white pigment was 1:20, 65 parts of the pigment modified in this way colored a zinc oxide linseed oil paste with the same strength as comparative dyestuff 1a. The same superiority concerning tinctorial strength was to be seen, when an intaglio printing ink on the basis of toluene was examined, as described in Example 1; tinctorial strength and shade remained stable to a large extent, even after a storage test of 7 days at 50° C.

EXAMPLE 6

The coupling was effected according to Example 1 with the modification that instead of the 2-acetylamino-benzoic acid, 0.88 part of 4-acetoacetylamino-benzamide were used, which corresponds to a molar ratio of 96:4. An intaglio printing ink on the basis of toluene, ground with the resulting pigment, showed, in comparison with an ink prepared with comparative dyestuff 1a, a tinctorial strength increased by 40% and a considerably purer shade. Color intensity and shade remained nearly unchanged, when the printing ink was submitted to a storage test for 7 days at 50° C.

EXAMPLE 7

17.01 parts of acetoacetylamino-benzene and 0.90 part of 4-acetoacetylamino-benzene sulfonamide were dissolved according to Example 1 and coupled with a diazo solution prepared according to Example 1 from 15.2 parts of 3-nitro-4-amino-toluene, at 15–20° C. within about 1.5 hours. Simultaneously with the diazo solution, a solution of 0.13 part of 3-aetoacetylamino-benzene-sulfonic acid, dissolved in 50 parts by volume of water, was introduced dropwise through a second dropping funnel under the surface of the coupling liquor in such a way that the addition of the additive component was completed about 10 minutes before coupling. The molar ratio of acetoacetylamino-benzene to acetoacetylamino-benzene-sulfonamide to acetoacetylamino-benzene-sulfonic acid was

96:3.5:0.5

After working up according to Example 1, a yellow pigment powder was obtained, which showed in a zinc oxide linseed oil paste with a ratio of color pigment to white pigment of 1:20, a 40% more intense dyeing than the equivalent amount by weight of the comparative dyestuff mentioned in Example 1. A much purer green shade of some more intensive color was obtained.

In a contradistinction to an ink prepared with the comparative dyestuff 1a, a toluene-intaglio-printing ink prepared with the obtained pigment showed a tinctorial strength increased by about 30% and a much purer shade. Tinctorial strength and shade remained practically constant, when the printing ink was submitted to a storage test of 7 days at 50° C.

EXAMPLE 8

16.83 parts of acetoacetylamino-benzene and 1.10 parts of 4-acetoacetylamino-benzoic acid were stirred with 250 parts by volume of water and dissolved by addition of 28 parts by volume of a 33% aqueous sodium hydroxide solution. After diluting with 1500 parts by volume of water there was added as cationic tenside a solution of 0.60 part of oleylamine in 0.60 part of glacial acetic acid and 30 parts by volume of water. Subsequently, the pH value was adjusted to 5.5 by addition of about 20 parts by volume of glacial acetic acid. The coupling with a diazo solution prepared according to Example 1 from 15.2 parts of 3-nitro-4-amino-toluene and the working up were effected according to Example 1. The molar ratio of the coupling components was 95:5.

Comparative dyestuff 8

According to the same method, a comparative dyestuff was prepared with the modification, that only acetoacetylaminobenzene was used, in the equivalent amount of 1772 parts.

The pigment modified in this way and the comparative dyestuff 8 were incorporated under the same conditions as described in Example 1, into a toluene-intaglio printing ink and subsequently submitted to a storage test for 7 days at 50° C. Tinctorial strength and shade of the color prepared with the modified pigment remained nearly constant, whereas the printing ink prepared with the comparative dyestuff 8 showed a considerable decrease of tinctorial strength and a considerable dulling of the shade.

EXAMPLE 9

(a) Diazotizing 17.3 parts of finely powdered 4-chloro-2-nitro-aniline were converted into the hydrochloride by stirring for several hours with 80 parts by volume of 5 N hydrochloric acid and diazotized in the usual manner after addition of 100 parts of ice by dropwise addition of 20.5 parts by volume of 5 N sodium nitrite solution within 2 hours. Then the whole was cleared with kieselguhr, and after separating the clearing agent, the nitrite in excess was eliminated with a sufficient amount of amidosulfonic acid.

(b) Coupling 20.31 parts of 2-acetoacetylamino-chloro-benzene and 1.02 parts of 4-chloro-3-acetoacetylamino-chloro-benzamide were stirred in 500 parts by volume of water and dissolved by addition of 28 parts by volume of a 33% aqueous sodium hydroxide solution. After diluting with further 500 parts by volume of water, the pH value was adjusted to 5.5 by addition of 20 parts by volume of glacial acetic acid. Main and additive component had a molar ratio of 96.4.

Coupling was effected within about 1.5 hours at a temperature of 20° C. When the coupling was finished, the whole was stirred for 30 minutes at room temperature. Then it was suction-filtered and thoroughly washed with water on the suction-filter. After drying in a drying device with circulating air at 50°–60° C., a yellow pigment powder was obtained.

Comparative dyestuff 9

According to the same method, a comparative dyestuff was prepared, but with the modification that only 2-acetoacetylamino-chloro-benzene was used, in the equivalent amount of 21.16 parts. When the ratio of color pigment to white pigment was 1:20, 80 parts of the modified pigment dyed a zinc oxide linseed oil paste with the same strength as 100 parts of the comparative dyestuff 9. When the modified pigment was incorporated into a toluene intaglio printing ink, a printing ink nearly fast to recrystallization was obtained, which in the lightening yielded prints of about 40% higher color intensity than the printing ink obtained with the comparative dyestuff 9.

EXAMPLE 10

Coupling was effected according to Example 9, with the modification that instead of the 4-chloro-3-acetoacetylamino-benzamide 0.94 part of 2-acetoacetylamino-toluene-4-carboxylic acid were used. The main and the additive component had the molar rator of 96:4. The obtained pigment showed similar properties like the pigment modified according to Example 9. When the ratio of color pigment to white pigment was 1:20, 75 parts of the modified pigment dyed a zinc oxide linseed oil paste with the same strength as 100 parts of the comparative dyestuff 9; furthermore, a much purer shade was obtained.

EXAMPLE 11

Coupling was effected according to Example 9 with the modification, that instead of 4-chloro-3-acetoacetylamino-benzamide 0.88 part of 3-acetoacetylamino-benzoic acid were employed. The molar ratio of main component and additive was 96:4.

When the ratio of the color pigment to the white pigment was 1:20, 80 parts of the pigment modified in this way dyed a zinc oxide linseed oil paste with the same strength as 100 parts of the comparative dyestuff 9. Simultaneously, a much purer, more intensive green shade was obtained.

EXAMPLE 12

14.9 parts of acetoacetylamino-benzene, 0.93 part of 2-acetoacetylamino-benzoic acid and 4.15 parts of 4-acetoacetylamino-benzamide were stirred with 250 parts by volume of water and dissolved by addition of 28 parts by volume of a 33% aqueous sodium hydroxide solution. After diluting with 1500 parts by volume of water, pH was adjusted to 5.5 by addition of about 20 parts by volume of glacial acetic acid. As non-ionogene tenside, 0.2 part of a condensation product of 1 mole of stearyl alcohol and 20 moles of ethylene oxide was added in form of an about 55% aqueous solution. The coupling with a diazo solution prepared according to Example 1 with 15.2 parts of 3-nitro-4-amino-toluene was effected within about 1.5 hours at a temperature of 15–20° C. When the coupling was completed, the whole was heated within 30 minutes to a temperature of 90° C. by introducing steam, and then stirring was continued for 30 minutes at this temperature. By adding cold water, it was cooled to about 70° C., suction-filtered at this temperature and thoroughly washed with water on the suction-filter. After drying and grinding, a yellow pigment powder was obtained. The molar ratio of acetoacetylamino-benzene to 2-acetoacetylamino-benzoic acid to 4-acetoacetylamino-benzamide was 80:2:18.

Comparative dyestuff 12

According to the same method, a comparative dyestuff was prepared with the modification, that only acetoacetylamino-benzene was employed, in the equivalent amount of 17.42 parts. When the ratio of color pigment to white pigment was 1:20, 85 parts of the modified pigment dyed a zinc oxide linseed oil paste with the same strength as 100 parts comparative dyestuff 12.

EXAMPLE 13

18.35 parts of 4-acetoacetylamino-toluene and 0.88 part of 2-acetoacetylamino-benzoic acid were stirred with 450 parts by volume of water and dissolved by addition of 28 parts by volume of a 33% sodium hydroxide solution. The resulting alkaline solution was precipitated in a high energy stirrer with about 20 parts by volume of glacial acetic acid and pH was adjusted to 5.5.

Coupling was effected at 20° C. and the diazonium salt solution prepared according to Example 9 from 17.3 parts of 4-chloro-2-nitro-aniline was introduced within about 1 hour under the surface of the intensively stirred coupling suspension. When the coupling was completed, stirring was continued for one hour at room temperature, then suction-filtered and thoroughly washed with water on the suction-filter. Drying was effected in a drying device with circulating air at 50–60° C. After grinding, a yellow pigment powder was obtained. The main and additive component had a molar ratio of 96:4.

Comparative dyestuff 13

According to the same method a comparative dyestuff was prepared with the modification that only 4-acetoacetylamino-toluene was used as coupling component, in the equivalent amount of 19.1 parts.

When the ratio of color pigment to white pigment was 1:20, 80 parts of the pigment modified in this way dyed a zinc oxide linseed oil paste with the same strength as 100 parts of the comparative dyestuff 13.

EXAMPLE 14

18.35 parts of 4-acetoacetylamino-toluene and 0.88 part of 2-acetoacetylamino-benzoic acid were dissolved and precipitated as described in Example 13. Coupling was effected at 20° C., and the diazonium salt solution prepared according to Example 1 from 15.2 parts of 3-nitro-4-amino-toluene was introduced within about one hour under the surface of the intensively stirred coupling suspension. The further working up was carried out as indicated in Example 13. The main component and the additive had a molar ratio of 96:4.

Comparative dyestuff 14

According to the same method, a comparative dyestuff was prepared, with the modification that only 4-acetoacetylamino-toluene was used as coupling component, in the equivalent amount of 19.1 parts.

When the ratio of color pigment to white pigment was 1:20,80 parts of the pigment modified in this way dyed a zinc oxide linseed oil paste with the same strength as 100 parts of the comparative dyestuff 14. Simultaneously, a distinctly more greenish, somewhat purer shade was obtained.

EXAMPLE 15

20.3 parts of 4-acetoacetylamino-chloro-benzene and 0.88 part of 2-acetoacetylamino-benzoic acid were stirred with 500 parts by volume of water and dissolved by adding 28 parts by volume of a 33% sodium hydroxide solution. The resulting solution was precipitated in a high energy stirrer by adding about 20 parts by volume of glacial acetic acid, and the pH value was adjusted to 5.5. Coupling was effected ta 20° C., and the diazonium salt solution prepared from 15.2 parts of 3-nitro-4-amino-toluene according to Example 1 was introduced within about 1 hour into the intensively stirred coupling suspension. The whole was worked up as indicated in Example 13. The molar ratio of the components was 96:4.

Comparative dyestuff 15

According to the same method, a comparative dyestuff was prepared with the modification that only 4-acetoacetylamino-chloro-benzene was used as coupling component, in the equivalent amount of 21.3 parts.

When the ratio of color pigments to white pigment was 1:20, 85 parts of the pigment modified according to the invention dyed a zinc oxide linseed oil paste with the same strength at 100 parts of the comparative dyestuff 15. Simultaneously a much purer some more intensive green shade was observed.

EXAMPLE 16

12.0 parts of 2-acetoacetylamino-anisole, 7.8 parts of 4-acetoacetylamino-1,3-dimethylbenzene and 0.88 part of 4-acetoacetylamino-benzamide were dissolved in 300 parts by volume of water and 50 parts by volume of 2 N sodium hydroxide solution. After addition of 0.1 part of the sodium salt of an anionic tenside obtained by condensation of oleyl chloride with N-methyltaurine, the alkaline solution was precipitated in the high energy stirrer by adding diluted acetic acid, prepared from 6.3 parts of glacial acetic acid and 50 parts by volume of water. Then 40 parts of crystallized sodium acetate were introduced into the resulting suspension. The coupling was effected at 20° C., and the diazo solution prepared from 17.3 parts of 4-chloro-2-nitro-aniline according to Example 9 was introduced within 40–45 minutes into the intensively stirred coupling suspension. When the coupling was completed, stirring was continued for 1 hour at room temperature, suction-filtered and thoroughly washed with water on the suction-filter. Drying was carried out in a drying device with circulating air at 50–60° C. After grinding, a yellow pigment powder was obtained. The 2-acetoacetylamino-anisole, the 4 - acetoacetylamino - 1,3-dimethylbenzene and the 4-acetoacetylamino-benzamide had a molar ratio of 58:38:4.

Comparative dyestuff 16

According to the same method, a comparative dyestuff was prepared with the modification, that a mixture of 2-acetoacetylamino-anisole and 4 - acetoacetylamino - 2,4-dimethylbenzene were used, with the amounts of 12.4 parts and 8.2 parts, corresponding to a molar ratio of 60:40. When the ratio of color pigment to white pigment was 1:20, a considerably purer, some more intensive green shade was obtained in a zinc oxide linseed oil paste than with the comparative dyestuff 16.

EXAMPLE 17

17.25 parts of 3-methyl-1-phenyl-pyrazolone-(5) and 0.32 part of 3-methyl-1-(2′,5′-dichloro-4′-sulfo-phenyl)-pyrazolone-(5) were dissolved in 400 parts by volume of water and 55 parts by volume of 2 N sodium hydroxide solution. This solution was mixed with 55 parts of crystallized sodium acetate and cooled to 5° C.

The diazo solution required was prepared from 15.2 parts of 3-nitro-4-amino-toluene according to Example 1.

For coupling the pyrazolone solution was introduced within 5 minutes, by stirring vigorously, under the surface of the diazo solution, and the temperature should range between 5 and 10° C. After adding the pyrazolone solution, stirring was continued for 1 hour at 5–10° C. and then for 2 hours at room temperature. The resulting pigment suspension was suction-filtered, thoroughly washed with water on the suction-filter and dried in the drying device with circulating air at 50–60° C. After grinding, an orange yellow pigment powder was obtained. The molar ratio of main component to additive was 99:1.

Comparative dyestuff 17

According to the same method, a comparative dyestuff was prepared with the modification that only 3-methyl-1-phenyl-pyrazolone-(5) was used, in the equivalent amount of 17.42 parts.

When the ratio of color pigments to white pigment was 1:20, 80 parts of the modified pigment dyed a zinc oxide linseed paste with the same strength as 100 parts of the comparative pigment. Furthermore, a much purer shade was obtained.

EXAMPLE 18

13.83 parts of 2-naphthol and 0.75 part of 2-hydroxy-3-naphthoic acid were suspended in 450 parts by volume of water and dissolved by addition of 28 parts by volume of a 33% aqueous sodium hydroxide solution. The obtained alkaline solution was precipitated in the high energy stirrer with a diluted acetic acid, prepared by mixing 20 parts by volume of glacial acetic acid with 50 parts by volume of water. Then, the pH value of the resulting fine suspension was adjusted to 5.5. The coupling with a diazo solution prepared according to Example 1 from 15.2 parts of 3-nitro-4-aminotoluene was carried out at 20° C. within 1 hour. When the coupling was finished, stirring was continued for 1 hour at room temperature, the resulting dyestuff was suction-filtered and thoroughly washed with water on the suction-filter. Drying was carried out in a drying device with circulating air at 50–60° C. After grinding, a red pigment powder was obtained. The main component and the additive had a molar ratio of 96:4.

Comparative dyestuff 18

According to the same method, a comparative dyestuff was prepared with the modification that only 2-naphthol was used as coupling component, in the equivalent amount of 14.41 parts.

In a lightening of 1:20, the pigment modified according to the invention dyes a zinc oxide linseed oil paste with a higher tinctorial strength than the comparative dyestuff 18. As concerns tincotroial strength 65 parts of the modified pigment correspond to 100 parts of the comparative dyestuff 18.

EXAMPLE 19

14.14 parts of 2-naphthol and 0.53 part of 6-bromo-2-hydroxy-3-naphthoic acid were dissolved, coupled and worked up, as indicated in Example 18. The molar ratio of main component and additive was 98:2. A red pigment powder was obtained, which showed to a large extent similar properties as the pigment modified according to Example 18.

EXAMPLE 20

14.27 parts of 2-naphthol were dissolved in 400 parts by volume of water and 28 parts by volume of a 33% aqueous sodium hydroxide solution. The resulting alkaline solution was precipitated in a high energy stirrer with a diluted acetic acid prepared from 20 parts by volume of glacial acetic acid and 50 parts by volume of water. A solution of 0.22 part of 1-naphthol-3-sulfonic acid in 50 parts by volume of water were added to the resulting fine suspension. Then the pH value was modified and adjusted to 5.5. The coupling with a diazo solution according to Example 1 from 15.2 parts of 3-nitro-4-amino-toluene and the working up was carried out according to the data of Example 18. The main component and the additive were in a molar ratio of 99:1.

Comparative dyestuff 20

According to the same method a comparative dyestuff was prepared with the modification that instead of 0.22 part of 1-naphthol-3-sulfonic acid 0.14 part of 1-naphthol were used. The main component and the additive non polar component in this case, had a molar ratio of 99:1.

In a lightening of 1:20, the pigment modified according to the invention dyed a zinc oxide linseed oil paste with a considerably higher tinctorial strength than the comparative dyestuff 20. As concerns tinctorial strength, 70 parts of the modified pigment corresponds to 100 parts of the comparative dyestuff 20. The shade obtained with the modified pigment is some more yellowish and much purer.

In order to examine the tinctorial strength in the lacquer, 35 parts of the pigment were treated for 40 minutes on the paint-shaker with 65 parts of a binding agent, consisting of 20% of a long-oil alkyd resin and 80% of white spirit. The so-obtained paste was diluted with further binding agents to a lacquer of 8% pigment content. This so-called full tone lacquer was lightened with a white lacquer containing titanium dioxide, in a ratio of 1:20, calculated on color pigment and white pigment. With the lacquer lightened in this way, there were prepared lacquer films which were compared with regard to color intensity.

The lacquer films obtained with the modified pigment had a higher color intensity than the films obtained with the comparative dyestuff 20. 65 parts of the modified pigment showed the same tinctorial strength as 100 parts of the comparative dyestuff 20.

A similar superiority of the pigment modified according to Example 20 was observed, when it was compared to comparative dyestuff 18. A comparison of the coloring properties between comparative dyestuff 20 and a comparative dyestuff 18, however, showed no remarkable difference.

EXAMPLE 21

Coupling was effected according to Example 20 with the modification that instead of 1-naphthol-3-sulfonic acid 0.30 part of 2-naphthol-3,7-disulfonic acid were used. The molar ratio of main component and additive was 99:1.

In a lightening of 1:20, 70 parts of the pigment modified in this way dyed a zinc oxide linseed oil paste with the same strength as 100 parts of the comparative dyestuff 18. When the tinctorial strength in a lacquer on the basis of a long-oil alkyd resin was examined, as described in Example 20, 75 parts of the modified pigment had the same tinctorial strength as 100 parts of the comparative dyestuff 18.

EXAMPLE 22

Coupling was effected according to Example 20, with the modification that 14.34 parts of 2-naphthol were used and that instead of 1-naphthol-3-sulfonic acid, 0.17 part of the disodium salt of the 2-naphthol-3,6-disulfonic acid were used. The molar ratio of the main component to the additive was 99.5:0.5.

70 parts of the pigment modified in this way show the same tinctorial strength as 100 parts of the comparative dyestuff 20, when the tinctorial strength of the pigment in the lacquer is examined as described in Example 20.

EXAMPLE 23

14.27 parts of 2-naphthol were dissolved in 55 parts by volume of 2 N sodium hydroxide solution and diluted with 450 parts by volume of water. 0.35 part of the disodium salt of the 2-naphthol-3,6-disulfonic acid was introduced into the alkaline solution, after having been dissolved in about 10 parts by volume of water. 14 parts of calcium carbonate were introduced while stirring and before coupling, 0.5 part of the sodium salt of the isobutyl-naphthalene-sulfonic acid was added in form of a 10% aqueous solution. The coupling with a diazo solution prepared according to Example 1 from 15.2 parts of 3-nitro-4-aminotoluene was carried out at 25° C., and the diazo solution was introduced within 2 hours under the surface of the intensively stirred coupling suspension. When the coupling was completed, the whole was adjusted to a slightly acidic reaction to Congo paper by addition of a small amount of hydrochloric acid and heated to 75° C. within 30 minutes by introducing steam. The whole was stirred at this temperature for 15 minutes, and the slightly acidic reaction to Congo paper was maintained by addition of hydrochloric acid. Immediately before suction-filtering the whole was adjusted to a neutral reaction to Congo paper by adding a little amount of calcium carbonate. The resulting pigment was thoroughly washed with water on the suction-filter and then dried at 50–60° C. in a drying device with circulating air. The molar ratio of main component to additive was 99:1.

Comparative dyestuff 23

According to the same method, a comparative dyestuff was prepared with the modification that only 2-naphthol was used, in the equivalent amount of 14.41 parts.

80 parts of the modified pigment were sufficient to dye a zinc oxide linseed oil paste, at a lightening of 1:20, with the same strength as 100 parts of the comparative dyestuff 23. Moreover, a much purer, some more intensive yellow shade was obtained.

EXAMPLE 24

(a) Diazotizing 17.3 parts of finely powdered 2-chloro-4-nitro-aniline were converted into the hydrochloride by stirring for several hours with 80 parts by volume of 5 N hydrochloric acid, and after addition of 100 parts of ice, they were diazotized in the usual manner by dropwise addition of 20.5 parts by volume of sodium nitrite solution. After clearing with kieselguhr, the nitrite in excess was eliminated with a sufficient amount of amidosulfonic acid.

(b) Coupling suspension 14.27 parts of 2-naphthol were dissolved in 400 parts by volume of water and 28 parts by volume of a 33% aqueous sodium hydroxide solution. After adding 0.30 part of naphthol-3,7-disulfonic acid, which had been dissolved in 50 parts by volume of water, the alkaline solution was precipitated with 20 parts by volume of glacial acetic acid in a high energy stirrer, and pH was adjusted to 5.5.

For coupling, the diazonium salt solution was introduced at 20° C. within 1 hour under the surface of the intensively stirred coupling suspension. Then the whole was stirred for 1 hour at room temperature, suction-filtered and thoroughly washed with water on the suction-filter. It was dried at 50–60° C. in a drying device with circulating air. After grinding, a red pigment powder was obtained. The main component and the additive had a molar ratio of 99:1.

Comparative dyestuff 24

According to the same method a comparative dyestuff was prepared with the modification that only 2-naphthol was used as coupling component, in the equivalent amount of 14.41 parts.

In a lightening of 1:20, 80 parts of the modified pigment dyes a zinc oxide linseed oil paste with the same strength as 100 parts of the comparative dyestuff 24.

EXAMPLE 25

Coupling was effected according to Example 24 with the modification that instead of 2-naphthol-3,7-disulfonic acid 0.35 part of the di-sodium salt of the 2-naphthol-3,6-disulfonic acid were used. Main component and additive had a molar ratio of 99:1.

In a lightening of 1:20, 75 parts of the pigment modified in this way dyed a zinc oxide linseed oil paste with the same strength as 100 parts of the comparative dyestuff 24. Simultaneously, a much purer, more intense yellow shade was obtained.

EXAMPLE 26

Coupling was carried out according to Example 24 with the modification that instead of 2-naphthol-3,7-disulfonic acid 0.22 part of 1-naphthol-3-sulfonic acid were used. Main component and additive had a molar ratio of 99:1.

In a lightening of 1:30, 75 parts of the pigment modified in this way, dyed a zinc oxide linseed oil paste with the same strength as 100 parts of the comparative dyestuff 24. Simultaneously a purer more intense yellow shade was obtained.

We claim:

1. A mixture of monoazo dyestuffs consisting of from 80 to 99.5 mol percent of 1 or 2 non-polar dyestuffs having formulas selected from D—N=N—A and D—N=N—B and from 0.5 to 20 mol percent of 1 or 2 polar dyestuffs having formulas selected from D—N=N—X and D—N=N—Y in which D represents phenyl which may be substituted by one to three members of the group consisting of lower alkyl, lower alkoxy, chlorine, bromine and nitro; A and B are different and are members of the group consisting of 1-naphthol, 2-naphthol, 1 aryl-3-lower carbalkoxy-pyrazolone-(5), 1-aryl-3-methyl-pyrazolone-(5) and acetoacetyl-aminobenzene, which may be substituted by one to three members of the group consisting of lower alkyl, lower alkoxy, chlorine, bromine and nitro; and X and Y are different and are selected from members of the same group as A and B but additionally contain 1 or 2 substituents selected from the group consisting of carboxy, sulfonic acid, carboxamido and sulfonamido.

2. A mixture of monoazo dyestuffs according to claim 1 comprising a mixture of 10 to 90 mol percent of D—N=N—X and from 90 to 10 mol percent of D—N=N—Y.

3. A mixture of monoazo dyestuffs according to claim 1 comprising a mixture of 5 to 95 mol percent of D—N=N—A and from 95 to 5 mol percent of D—N=N—B.

4. A mixture of monoazo dyestuffs according to claim 1 containing 1 to 5 mol percent of said polar dyestuffs and from 95 to 99 mol percent of said non-polar dyestuffs.

5. A method of making a mixture of polar and non-polar monoazo dyestuffs which comprises preparing a mixture of 80 to 99.5 mol percent of one or two non-polar coupling components having formulas selected from H—A and H—B and from 0.5 to 20 mol percent of one or two coupling components having formulas selected from H—X and H—Y, wherein A and B are different and are members of the group consisting of 1-naphthol, 2-naphthol, 1-aryl-3-lower carbalkoxy-pyrazolone-(5), 1-aryl-3-methyl-pyrazolone-(5) and acetoacetyl-aminobenzene, which may be substituted by one to three members of the group of lower alkyl, lower alkoxy, chlorine, bromine and nitro, and X and Y represent the same substituents as A and B but which contain additionally 1 or 2 substituents selected from carboxy, sulfonic acid, carboxamido and sulfonamido groups; reacting the mixture of coupling components with an approximately equimolar quantity of a diazotized amine of the formula D—NH$_2$, wherein D represents phenyl which may be substituted by a 1 to 3 members of the group consisting of lower alkyl, lower alkoxy, chlorine, bromine and nitro; and recovering the resulting mixture of monoazo dyestuffs from the reaction mixture.

6. A method according to claim 5 wherein a mixture of non-polar coupling components having the formulas H—A and H—B is used and the mixture contains from 5 to 95 mol percent of H—A and from 95 to 5 mol percent of H—B.

7. A method according to claim 5 wherein a mixture of polar coupling components is used having the formulas H—X and H—Y and the mixture contains from 10 to 90 mol percent of H—X and from 90 to 10 mol percent of H—Y.

References Cited
UNITED STATES PATENTS

| | | | |
|---|---|---|---|
| 3,446,640 | 5/1969 | Orlova et al. | 106—288 Q |
| 3,446,641 | 5/1969 | Mitchell et al. | 106—288 Q |
| 3,516,979 | 6/1970 | Dore et al. | 106—288 Q |

JAMES E. POER, Primary Examiner